May 22, 1962

W. A. RAY 3,035,608

GAS PRESSURE REGULATOR WITH SEMI-BALANCED INNER VALVE MEMBER

Filed Sept. 8, 1958

INVENTOR.
WILLIAM A. RAY
BY Lyon+Lyon
ATTORNEYS

INVENTOR.
WILLIAM A. RAY
BY Lyon & Lyon
ATTORNEYS 3,035,608
GAS PRESSURE REGULATOR WITH SEMI-
BALANCED INNER VALVE MEMBER
William A. Ray, North Hollywood, Calif., assignor to
General Controls Co., Glendale, Calif., a corporation
of California
Filed Sept. 8, 1958, Ser. No. 759,608
4 Claims. (Cl. 137—505.41)

The present invention relates to apparatus for controlling the flow of fluids and in particular, to gas regulators.

An object of the present invention is to provide an improved gas regulator which is used in gas supply lines for supplying gas to such devices as furnaces, stoves, refrigerators and the like, for the purpose of automatically maintaining substantially constant inlet pressures to the device despite rather wide variations in the pressure in the supply lines.

Another object of the present invention is to provide an improved gas regulator which is of the semi-balanced type and which may be made relatively small and inexpensively, considering the large amounts of gas which is controlled thereby.

Another object of the present invention is to provide an improved gas regulator having improved constructional features therein not found in a commercially available gas regulator of the same physical size and having the same B.t.u. rating.

Another object of the present invention is to provide an improved gas regulator having constructional features whereby a relatively low pressure drop and a low energy loss occurs through the valve.

Another object of the present invention is to provide an improved gas regulator in which there is relatively low resistance to gas flow offered by the valve elements.

Another object of the present invention is to provide an improved gas regulator which by virtue of a semi-balanced arrangement, is sensitive to pressure variations such that the outlet pressure may be controlled so as to be more substantially constant despite large variations in inlet pressure.

Another object of the present invention is to provide improved gas regulators in which vibration or fluttering of the valve element at intermediate positions is substantially eliminated.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
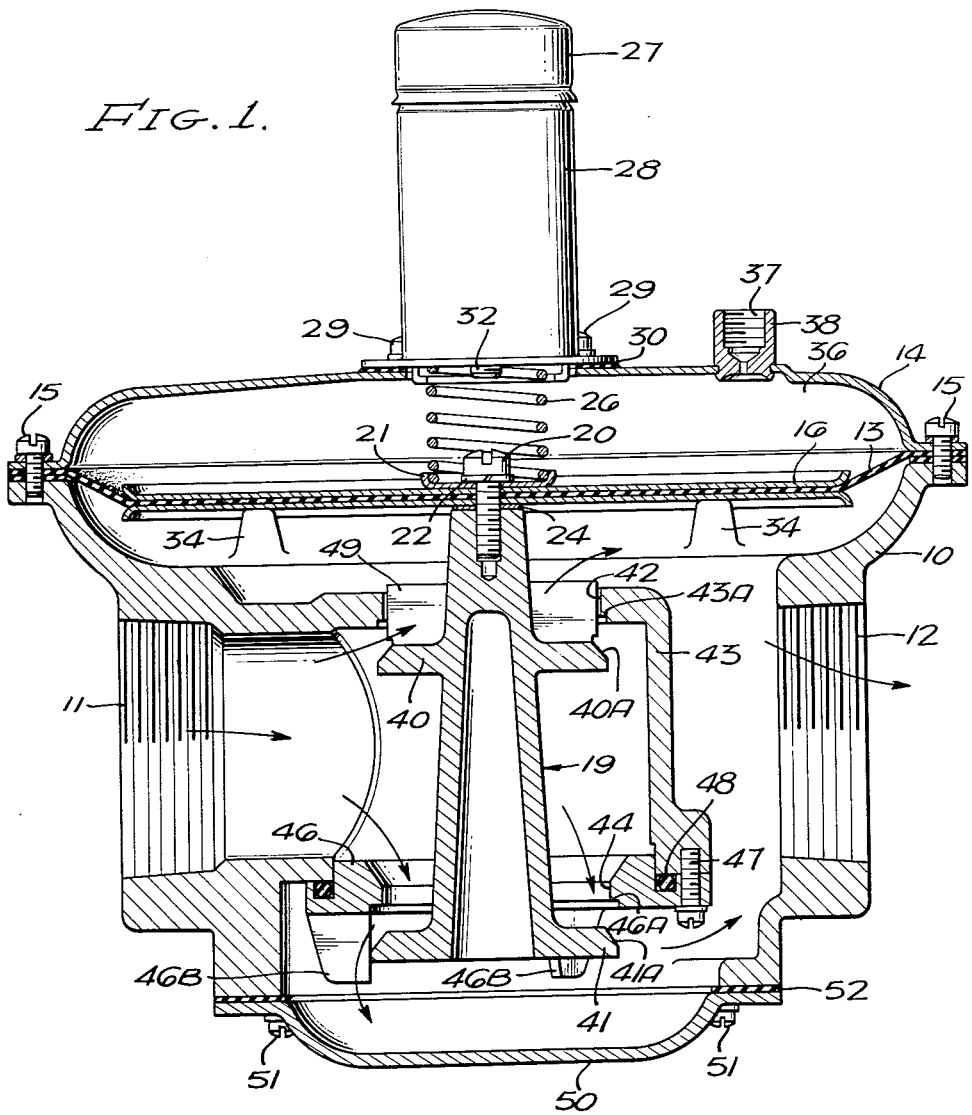
FIGURE 1 illustrates an improved gas regulator embodying features of the present invention.

The gas regulator has a valve body 10 in which there are threaded inlet and outlet ports or openings 11 and 12, respectively.

A flexible circular diaphragm 13 of gas impervious material has its marginal edge or circumferential portion clamped between the valve body 10 and the cover member 14 by means of circumferentially spaced machine screws 15 which are threaded in the flanged portion of the valve body 10. This diaphragm 13, as shown, has its major portion sandwiched between a pair of metal discs 16 and 17, each having its peripheral portion turned outwardly from the diaphragm 13 to avoid the adjacent portion of the diaphragm 13 from engaging a sharp edge. This assembly comprising the diaphragm 13 and discs 16 and 17 is secured to the movable valve element 19 by a central machine screw 20 which extends through a disc shaped spring seat 21, assembly 13, 16 and 17 and which is threaded into the valve element 19. A lock washer 22 may be placed between the head of the bolt 20 and the spring seat 21 to secure the bolt in position and preferably, an annular seal 24 is sandwiched between the valve element 19 and the disc 17 as shown.

The diaphragm 13 is flexed downwardly by an adjustable prestressed coil compression spring 26 which has its lower end bearing against the spring seat 21. The compressive force exerted by the compression spring 26 is adjusted using conventional means once the removable cover 27 is removed. The upper portion of the spring 26 is housed within a cylindrical member 28 which is bolted by means of circumferentially spaced bolts 29 to the cover member 14 and preferably, a ring shaped seal 30 is clamped by such bolts between the elements 29 and 14. An adjustable screw 32 is threaded in the cylindrical member 28 and such screw 32 may be turned if the cap 27 is removed. By turning the screw 32, the compressive force exerted by the spring 26 on the diaphragm 13 is adjusted in conventional manner. Downward movement of the diaphragm 13 is limited by engagement of the disc 17 with spaced abutments or stops 34 formed integrally with the valve body 10.

It is observed that the diaphragm 13 defines one wall of a chamber 36 which is preferably vented to the atmosphere through the threaded opening 37 in the small tube 38 which is secured within an apertured portion of the cover member 14.

It is noted that the valve element 19 is generally in the form of a hollow truncated cone and has a pair of spaced flanged portions 40 and 41, each of circular form and each having a circumferentially beveled portion 40A and 41A, respectively.

The flanged portion 40 cooperates with an annular opening 42 in the valve body portion 43 to regulate the flow of gas therethrough and in similar manner, the flanged portion 41 cooperates with the opening 44 in the valve element 46 which is secured to the valve body portion 43 by a series of circumferentially spaced bolts 47 threaded into the member 43. Preferably an O-ring 48, serving as a seal, is recessed within a grooved portion of the element 46 and is squeezed against the body portion 43 when the screws 47 are tightened.

In order to substantially eliminate sidesway of the valve element 19, guide means for the same is provided and as shown, such guide means may comprise ribs 49 on the valve element 19 cooperating the the circular wall of body portion 43 which defines the opening 42.

In the extreme upward position of the valve element 19, the beveled portions 40A and 41A each make a line contact, on a circle, with the circular edges 43A and 46A, respectively, of valve body portion 43 and valve element 46 and then, to assure this condition, the valve body portion 43 and valve element 46 may be undercut as shown, to define these accurately spaced circular edges 43A and 46A.

The lower portion of the valve casing 10 is closed by a cover 50 with circumferentially spaced bolts 51 which are threaded in the valve body 10 and so as to squeeze the ring shaped seal 52 between the cover 50 and valve body 10. It is observed that when the cover 50 is removed, a relatively large opening exists for assembly and disassembly of the member 46 and the valve element 19.

It will also be observed that the flange 40 has an effective area which is somewhat smaller than the effective area of the flange 41.

In operation of the gas regulator, the pressure at the outlet 12 is controlled by movement of the diaphragm 13 which either serves to move the valve element upwardly or downwardly, depending upon whether the pressure at the outlet is above or below a preset value established by adjustment of the spring 26.

It will be observed that the pressure on the inlet side acting on the flange 40 tends to move the valve element 19 towards closed position and also, that such pressure acting on the flange 41 tends to move the valve element 19 towards open position. These two tendencies are counteracted to a large extent but since the effective area of flange 41 is larger than the effective area of flange 40, there is a resultant tendency for the valve element 19 to move to open position with increased inlet pressures; however, this resultant tendency is overridden by the large forces developed on the relatively large effective area of the diaphragm 13 and as a consequence, the pressure at the outlet remains substantially constant and unaffected by the gas pressures exerted on valve element 19.

The valve element 19, as well as the body portion 43 and element 46 are each of metal.

Also, to ensure a straight line movement of the valve element 19, not only are guide ribs 49 provided as previously explained but, also guide ribs 46B contacting peripheral portions of the flange 41 are integrally formed and extend downwardly from the valve element 46.

Figure 2:
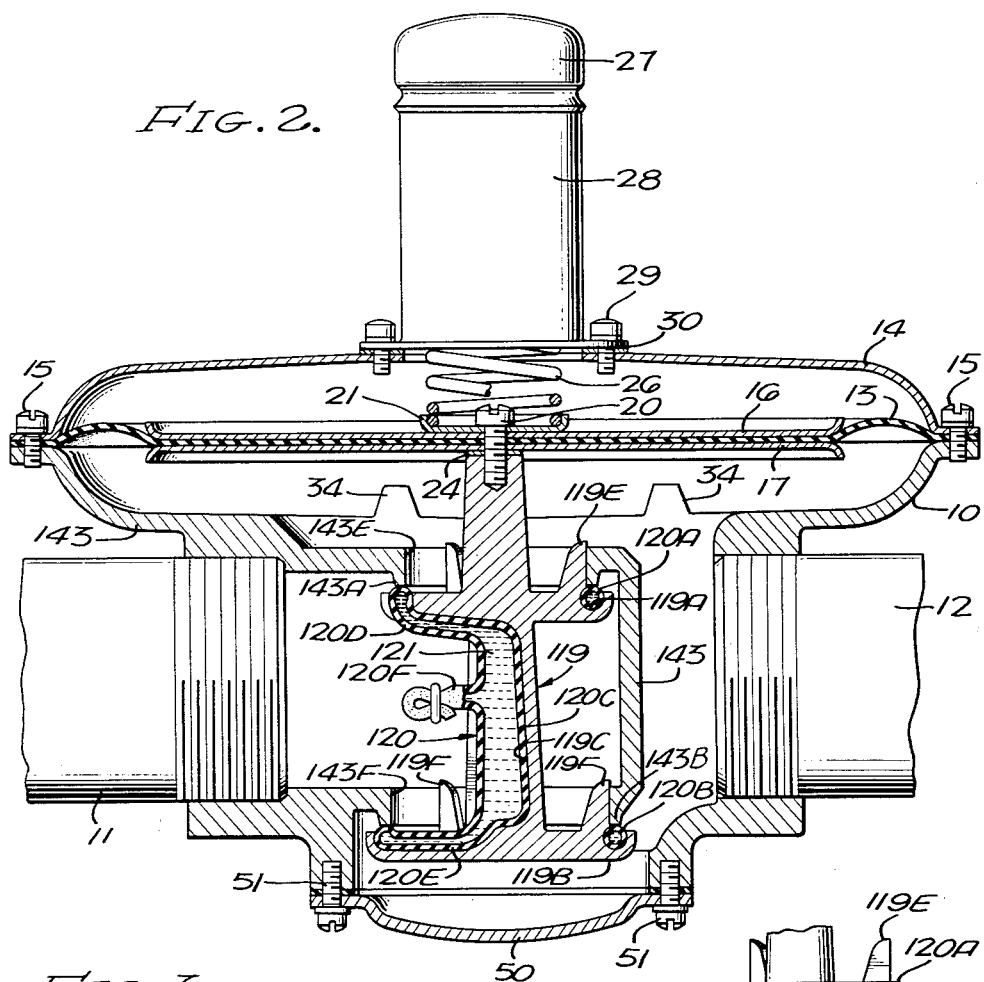
FIGURE 2 illustrates a modified construction.
Figure 3:
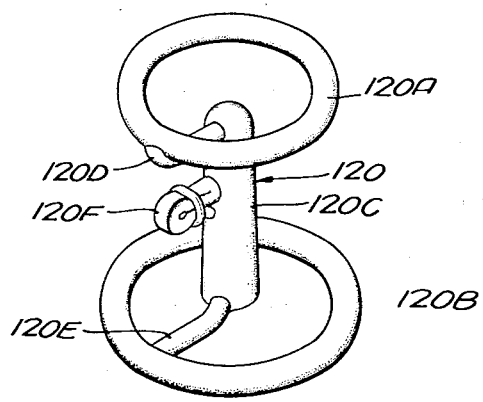
FIGURES 3 and 4 illustrates details of the gas regulator shown in FIGURE 2.
Figure 4:
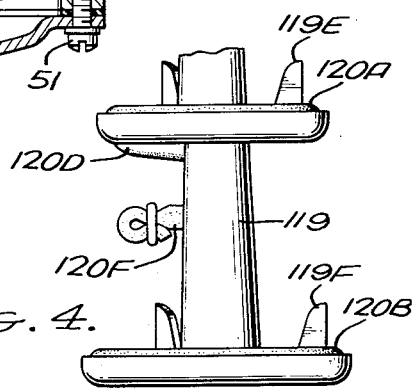

The gas regulator shown in FIGURES 2–4 incorporates constructional features of the valve shown in FIGURE 2 and in addition incorporates a novel seal. The purpose of the valve shown in FIGURE 2 renders it possible to obtain a double seated valve which will take higher inlet pressures and on which there is tight shutoff or acceptable performance for so-called "dead-end service." For example, in a typical installation the gas pressure may extend as high as 1 or 2, or 5 to 10 pounds per square inch and having an outlet pressure as low as 6 to 8 inches of water which is approximately ¼ pound per square inch. In such case it is not desired to have a pressure build-up on the discharge side of the regulator when the main valve shutoff is closed; hence the necessity for a tight seat regulator. This requirement is not satisfied by the construction shown in FIGURE 1.

In general, there have been double seat valves heretofore provided which use soft seats ostensibly for "dead-end service." Difficulties and unsatisfactory operation occur largely due to the fact that one seat will wear more than the other or such unsatisfactory operation will result from in general the fact that the two seats do not behave in exactly the same manner. For example, all rubber seats settle down and "ring" as it is often referred to. Such "ring" action is due partly to the fact that the pressure is on the top side of one rubber seat and on the lower side of the other rubber seat. Also, there are variations in the rubber itself, in the contour of the seat, and in the amount of effective or available "land" on the seat with the result that after a short time of service a double soft-seated valve usually leaks or otherwise operates unsatisfactorily. In accordance with the important feature of the present invention as illustrated in FIGURE 2, the two seats are hydraulically interconnected by rubber rings under pressure so as to assure an equal pressure on each seat. The valves shown in FIGURES 1 and 2 are generally of the same construction and corresponding parts have identical reference numerals for ease of comparison. It is noted that the valve element 119 in FIGURE 2 corresponding to the valve element 19 of FIGURE 1 is of different construction in that it is adapted to receive an elastic specially formed chamber 120 filled with liquid 121 under slight pressure. This chamber 120 is perhaps best illustrated in FIGURE 3 and in general is in the form of two hollow rings 120A and 120B which are each in communication with a central hollow tube 120C and conduits 120D and 120E. After the chamber 120 comprising such elements is filled with liquid, it is sealed by, for example, doubling back and tying the inlet tube 120F as shown in FIGURE 3. The element 120 thus formed is seated in the valve element as shown in FIGURE 2 either before or after being filled with liquid 121. It is observed that the valve element 119 is suitably recessed to snugly accommodate this sealing element 120. For this purpose the valve element 119 is provided with an annular grooved portion 119A to accommodate the valve seat 120A and at its lower end the valve element 119 is provided with the annular grooved portion 119B to accommodate the valve seat 120B. Further, such valve element 119 is suitably recessed at 119C to snugly accommodate the interconnecting tubular portion 120C. The valve seat 120A cooperates with the stationary valve seat 143A of the valve casing 143 and in similar manner valve seat 120B cooperates with the valve seat 143B on the valve casing 143.

Up and down movement of the valve element 119 is guided by a series of upper ribs 119E cooperating with the annular opening 143E in the valve opening and also by a series of ribs 119F on the valve element 119 cooperating with the annular opening 143F at the lower end. While the opening 143E is shown somewhat smaller than the opening 143F, it is understood that it is within the province of the present invention, and is indeed desirable to do so, to have these openings 143E and 143F of the same diameter to obtain a more balanced condition.

In operation of the device shown in FIGURE 2 it will be observed that the inlet pressure in conduit 11 acts on the elastic structure 120 to cause equal pressures to be developed in the valve seats 120A and 12B to thereby assure complete sealing of the valve in its closed position. This is so since there is even seat pressure distribution. Instead of using a liquid 121, this chamber may be filled with a gas. The regulator thus shown in FIGURE 2 may be used as a shutoff valve for preventing the flow of gas when, for example, the inlet pressure applied to conduit 11 is 5 pounds per square inch.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A gas regulator comprising a valve body having a valve chamber, said body having inlet and outlet openings, said passages being substantially on a common axis, said valve chamber having a pair of valve openings which lie on a second axis which is substantially perpendicular to said common axis, a valve element having a pair of valve seats each cooperating with a corresponding one of said openings, said valve seats each being hollow, elastic, interconnected and filled with a fluid which is subjected to pressure in said inlet, and a diaphragm responsive to the pressure in said outlet opening for moving and positioning said valve element relative to said valve openings so that the position of said valve element is automatically determined by said pressure.

2. A gas regulator comprising a valve body having a valve chamber, said body having inlet and outlet openings, said valve chamber having a pair of valve openings a double seated valve element cooperating with each of said openings and comprising a pair of hollow elastic interconnected valve seats filled with liquid which is subjected to inlet pressure, and a diaphragm responsive to the pressure in said outlet opening for moving and positioning said valve element seats relative to said valve openings so that the position of said valve element is automatically determined by said pressure.

3. In a gas regulator of the character described having a pair of valve seats each cooperating with a corresponding opening in a valve body for controlling the flow of gas from the inlet to the outlet of the regulator, the improvement which resides in making said valve seats elastic and hollow, and providing means for intercommunicating the same with a fluid which is subjected to pressure in said inlet for equalizing the fluid pressure in each of said valve seats.

4. A gas regulator comprising a valve body having an inlet and an outlet opening axially aligned along generally a common axis, said valve body having a chamber with a pair of valve openings therein, a single-piece streamlined valve element movable transversely to said axis and having a pair of spaced flanges thereon each cooperating with a corresponding one of said openings to restrict gas flow therethrough, said flanges being of unequal area with the pressure in said inlet opening acting on the flange of smaller area to close the corresponding adjacent valve opening and with the pressure in said inlet opening acting on the flange of larger area to open the corresponding adjacent valve opening, a diaphragm connected to said valve element and responsive to pressure at said outlet for moving said valve element in one direction, spring means tending to move said valve element in a direction opposite from said one direction, two hollow elastic valve seats, one of which is mounted on a corresponding one of said flanges, elastic conduit means interconnecting each of said valve seats, a fluid in said seats and conduit means, said conduit means being subjected to pressure in said inlet.

References Cited in the file of this patent
UNITED STATES PATENTS

| | | |
|---|---|---|
| 965,999 | Faget | Aug. 2, 1910 |
| 1,231,293 | Peters | June 26, 1917 |
| 2,091,051 | Mesinger | Aug. 24, 1937 |
| 2,731,036 | Hughes | Jan. 17, 1956 |
| 2,737,979 | Parker | Mar. 13, 1956 |
| 2,752,941 | Mitchell | July 3, 1956 |
| 2,786,487 | Spence | Mar. 26, 1957 |
| 2,853,268 | Hughes | Sept. 23, 1958 |

FOREIGN PATENTS

| | | |
|---|---|---|
| 1,060,865 | France | Nov. 25, 1953 |
| 534,171 | Belgium | May 28, 1956 |